(12) United States Patent
Mortensen et al.

(10) Patent No.: US 9,552,437 B1
(45) Date of Patent: Jan. 24, 2017

(54) CONTENT POSITION RECOMMENDATIONS

(71) Applicant: Outbrain Inc., New York, NY (US)

(72) Inventors: Dennis R. Mortensen, New York, NY (US); Alex Poon, White Plains, NY (US); Varun Vijayaraghavan, West New York, NJ (US)

(73) Assignee: Outbrain Inc., New York, NY (US)

( * ) Notice: Subject to any disclaimer, the term of this patent is extended or adjusted under 35 U.S.C. 154(b) by 0 days.

(21) Appl. No.: 14/312,948

(22) Filed: Jun. 24, 2014

(51) Int. Cl.
*G06F 17/30* (2006.01)
*G06F 17/22* (2006.01)

(52) U.S. Cl.
CPC ....... *G06F 17/3089* (2013.01); *G06F 17/2235* (2013.01)

(58) Field of Classification Search
CPC ........ G06F 17/21; G06F 17/211; G06F 17/22; G06F 17/2235; G06F 17/2241; G06F 17/2247
USPC .......................... 715/205, 206, 208, 234, 243
See application file for complete search history.

(56) References Cited

U.S. PATENT DOCUMENTS

| | | | |
|---|---|---|---|
| 6,601,021 B2 * | 7/2003 | Card et al. | 702/187 |
| 7,627,592 B2 * | 12/2009 | Crockett et al. | |
| 8,229,915 B1 * | 7/2012 | Lloyd et al. | 707/709 |
| 8,352,884 B2 * | 1/2013 | Zalewski et al. | 715/864 |
| 8,543,900 B1 * | 9/2013 | Kent | 715/205 |
| 2002/0099829 A1 * | 7/2002 | Richards et al. | 709/227 |
| 2010/0241486 A1 * | 9/2010 | Garg et al. | 705/10 |
| 2010/0274663 A1 * | 10/2010 | Hinton | G06Q 30/02 705/14.43 |
| 2011/0035263 A1 * | 2/2011 | Ramanathan | G06F 3/0485 705/14.4 |
| 2011/0137733 A1 * | 6/2011 | Baird | G06Q 30/0272 705/14.68 |
| 2011/0196733 A1 * | 8/2011 | Li et al. | 705/14.42 |
| 2012/0005569 A1 * | 1/2012 | Roh | 715/234 |
| 2012/0136722 A1 * | 5/2012 | Kothiwal et al. | 705/14.54 |
| 2012/0290433 A1 * | 11/2012 | England | G06Q 30/0282 705/26.7 |
| 2013/0104025 A1 * | 4/2013 | Bennett et al. | 715/234 |
| 2013/0166394 A1 * | 6/2013 | Churchill et al. | 705/14.72 |
| 2013/0204715 A1 * | 8/2013 | Zhang | G06Q 30/0277 705/14.73 |
| 2014/0297401 A1 * | 10/2014 | Bax et al. | 705/14.45 |

\* cited by examiner

*Primary Examiner* — Andrew Dyer
(74) *Attorney, Agent, or Firm* — Lowenstein Sandler LLP

(57) ABSTRACT

A user data-driven method and system for generating position recommendations for content links on a web page is disclosed. The method and system collect user activity data associated with a set of content links positioned in one or more content position boxes of the multiple content position boxes of a web page during an activity window. An engagement measurement associated with a particular content link of the set of content links during the activity window is determined. A performance delta for a particular content link based on the calculated engagement measurement associated with the particular content link is determined. Multiple predicted user engagement measurements associated with moving the particular content link to a plurality of updated positions is determined. The method and system generate content position recommendations associated with the particular content link based on a comparison of the multiple predicted user engagement measurements.

13 Claims, 6 Drawing Sheets

US 9,552,437 B1

CONTENT POSITION RECOMMENDATIONS

TECHNICAL FIELD

The present disclosure relates to content recommendations and, more particularly, to a technique of determining recommendations relating to the positioning of content on a webpage.

BACKGROUND

In the digital content publishing industry, it is desirable for a content publisher (e.g., a website provider) to present its users not only with interesting, relevant, trustworthy and engaging content in an initial form (e.g., a webpage), but also provide users of the publisher's content with additional recommended content. Furthermore, it is a goal for a content publisher to provide its users with content in a manner which maximizes user consumption. An aspect impacting a user's level of engagement with content on a webpage is the position of the content on the webpage itself. In conventional web publishing, a human editor managing the content of a web page is tasked with inefficiently deciding a respective position for placement of various content elements within the layout of the web page. However, an approach is needed to automatically determine optimal positions on the web page for multiple content links.

BRIEF DESCRIPTION OF THE DRAWINGS

The present disclosure will be understood more fully from the detailed description given below and from the accompanying drawings of various implementations of the disclosure.

DETAILED DESCRIPTION

A system and method for determining a content placement recommendation associated with one or more content links of a webpage is described, according to various implementations. Content providers (also referred to as a "publisher") provide for the publication of content links at various positions in a document (also referred to as a "web page"). The publisher and associated web page may be associated with a recommendation source configured to provide one or more content recommendations to be provided as a respective content link on the web page. A content link, content recommendation or recommendation hereinafter refers to a representation of digital content. A content link represents and identifies content that is accessible by a user and can include one or more of text, a link (e.g., a URL), a thumbnail, an image, an icon, a video, a document, a file, etc. A document hereinafter refers to any electronic presentation of content, including, for example, a webpage, a mobile application graphical user interface (GUI), etc.

In an embodiment, a method and system are provided for determining a recommended position on a web page for multiple content links. Multiple content links are arranged on corresponding positions on a web page. In an embodiment, user activity data associated with multiple users relating to the arranged content links is collected during an activity window. The activity window may be any suitable time period, such as, for example, 1 hour, 5 hours, 24 hours, 25 hours, etc. The collected user activity data includes a set of interactions (e.g., impressions, clicks, selections, visits, views) by one or more users with a content link of the web page occurring during the activity window.

In an embodiment, based on the collected user activity data, a user engagement measurement (e.g., CTR) is calculated for each content link of the set of content links of the web page during the activity window. The method and system may determine a prediction relating to an optimized position for each of the content links on the web page. Furthermore, a recommendation as to the optimized position for each content link is generated. Advantageously, a human editor associated with the web page may utilize the content link position recommendations to determine an optimized layout of the multiple content links on the web page.

The present disclosure describes efficient and optimal techniques for effectively providing a recommended position on a web page for a content link based on collected user activity data.

Figure 1:
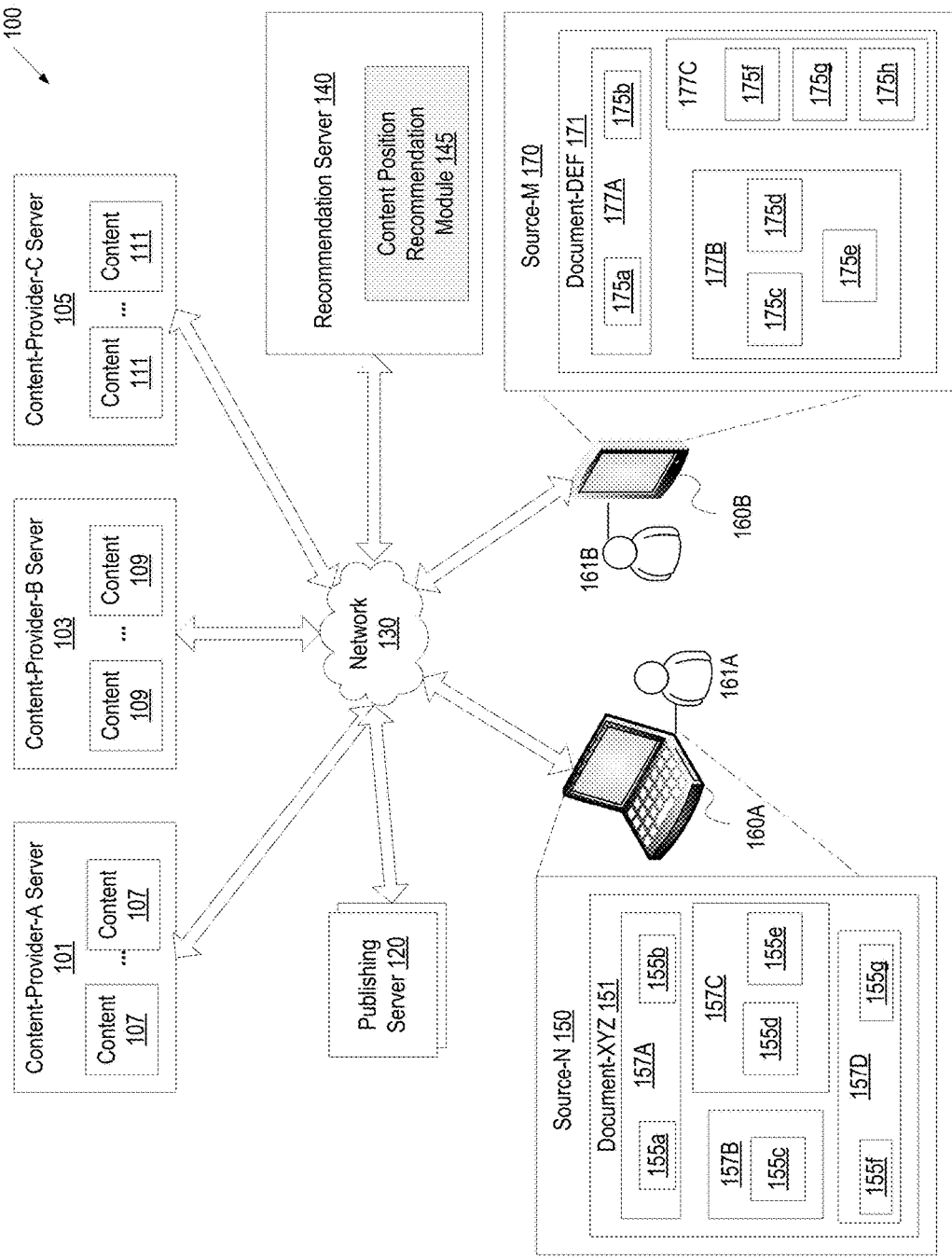
FIG. 1 illustrates an example system architecture in which examples of the present disclosure can be implemented.

FIG. 1 illustrates an example system architecture 100 in which examples of the present disclosure can be implemented. The system architecture 100 can include one or more user devices 160A-B, one or more content provider servers 101, 103, 105, one or more destination servers (e.g., publishing servers 120) and one or more recommendation servers 140 coupled to each other over one or more networks 130.

A publisher may publish a web page (e.g., Source-N 150, Source-M 170) for presenting multiple content links to a user (e.g., user 161A, user 161B). According to implementations, the web page (e.g., Source-N 150, Source-M 170) may include a document (e.g., Document-XYZ 151 and Document-DEF 171) having a layout including multiple content zones (e.g., content zones 157A, 157B, 157C, 157D of Document-XYZ 151 and content zones 177A, 177B, and 177C of Document-DEF 171). A content zone is an area, location region, portion, or section of the web page which includes a group or set of one or more content position boxes (e.g., content position boxes 155*a-g* of content zones 157A-D of Document-XYZ 151) having one or more link positions. A content position box represents an area, location, position, portion, or section of a corresponding content zone wherein one or more content links may be presented. In an implementation, the content position box represents a location of the web page wherein one or more content links may be placed for presentation to a user (e.g., user 161A, 161B). For example, content zone 157C includes two content position boxes (155*d*, 155*e*) within which one or more content links may be positioned. The link position represents a position or location within the content position box where a content link is placed. The source (e.g., Source-N 150, Source-M 170) may be for example, and is not limited to, a website homepage, section front, web page, mobile application user interface (UI), gaming application UI, television application UI, etc.

In an implementation, the content zone may represent any editorial parameter, filter, category, classification, type, or attribute used to define or delineate a particular area or section for the grouping of related content position boxes. For example, a content zone (e.g., content zone 157A) may correspond to a category or classification such as "Top Stories" having two content position boxes (155*a*, 155*b*) configured to include content links relating to content considered to be in the "Top Stories" category.

In an implementation, one or more content links presented in the multiple content position boxes (e.g., 157*a-g*, 175*a-h*) may be provided by any one of the publishers (e.g., Source-N 150, Source-M 170) or a content host or provider 101, 103, 105 (herein referred to as the "content sources") having one or more elements of content (e.g., content 107, 109, 111).

The content, as represented by a content link in the document (e.g., a web page), can be a representation of digital content. Digital content can include, for example, such as, and not limited to, an article, a web blog entry, a social media posting, a data feed, an advertisement, a document (e.g., webpage), digital video, digital movies, digital photos, digital music, social media updates, electronic books (ebooks), electronic magazines, digital newspapers, digital audio books, electronic journals, electronic comic books, software applications, etc.

The content host or provider 101, 103, 105 includes any entity and/or platform hosting candidate content (e.g., webpages, mobile application graphical user interfaces (GUIs), gaming application GUIs, television application GUIs, etc.) 107,109,111. For example, SportsNews, Inc. and BaseballNews, Inc. may be content providers. The content provider platforms can include publishing servers 120. The publisher servers 120 can be application servers that provide one or more applications (e.g., web application, mobile application, desktop application, gaming console applications, television console application, etc.). The publishing servers 120 can be coupled to one or more data stores that store publisher data and/or recommendations of content providers. In an implementation, the content providers may wish to publish their respective content 107,109,111 in widespread locations (e.g., the documents presented by Source-N 150 and Source-M 170).

In an implementation, a recommendation server 140 communicates with the multiple publishers (e.g., Source-N 150 and Source-M 170) to provide the publishers with recommendations relating to the positioning of the one or more content links (e.g., a path to the content 107, 109, 111) in the respective content position boxes of the publisher's document (e.g., Document-XYZ 151, Document-DEF 171). The recommendation service provider can host one or more recommendation servers 140 to provide the service to the content providers and target publishers. The servers 140 include a content position recommendation module 145 configured to determine a position recommendation for each of a set of content links for display on a web page. The content position recommendation module 145 is a software component (e.g., a set of instructions residing in a memory) executable by one or more processing devices to perform the content position recommendation activities described herein (e.g., the methods described in detail in connection with FIGS. 3-4). The instructions of the content position recommendation module 145 may reside in a memory including any suitable computer readable storage medium, such as volatile memory devices (e.g., random access memory (RAM)), non-volatile memory devices (e.g., flash memory), a magnetic hard disk, a Universal Serial Bus (USB) solid state drive, a local disk, an external disk, and/or other types of memory devices).

In an implementation, the network of content providers can include, for example, multiple candidate elements of content 107,109,111 that may be stored in one or more data stores that are coupled to the network 130. The architecture 100 can include, for example, multiple documents 150,170 that are accessed by multiple users 161A-B on various user devices 160A-B.

The networks 130 can include one or more local area networks (LAN), one or more wireless networks, one or more mobile communications networks, one or more wide area networks (WAN), such as the Internet, or similar communication systems, or combinations of such. The networks 130 can include one or more networking and/or computing devices such as wired and wireless devices. In one implementation, not all servers 101,103,105,120,140, and/or user devices 160A-B are directly connected to each other. The networks 130 may be separate networks.

The servers 101,103,105,120,140 can be hosted on one or more machines. The machines can include for example, and are not limited to, any data processing device, such as a desktop computer, a laptop computer, a mainframe computer, a server computer or any other device configured to process data.

A user device 160A-B can be a computing device such as a server computer, a desktop computer, a set-top box, a gaming console, a television, a portable computing device such as, and not limited to, mobile telephones, personal digital assistants (PDAs), portable media players, netbooks, laptop computers, a tablet computer, an electronic book reader, a wearable electronic device and the like. For example, user device 160A may be a laptop computer and user device 160B may be a tablet computer or a mobile smartphone.

Figure 2:
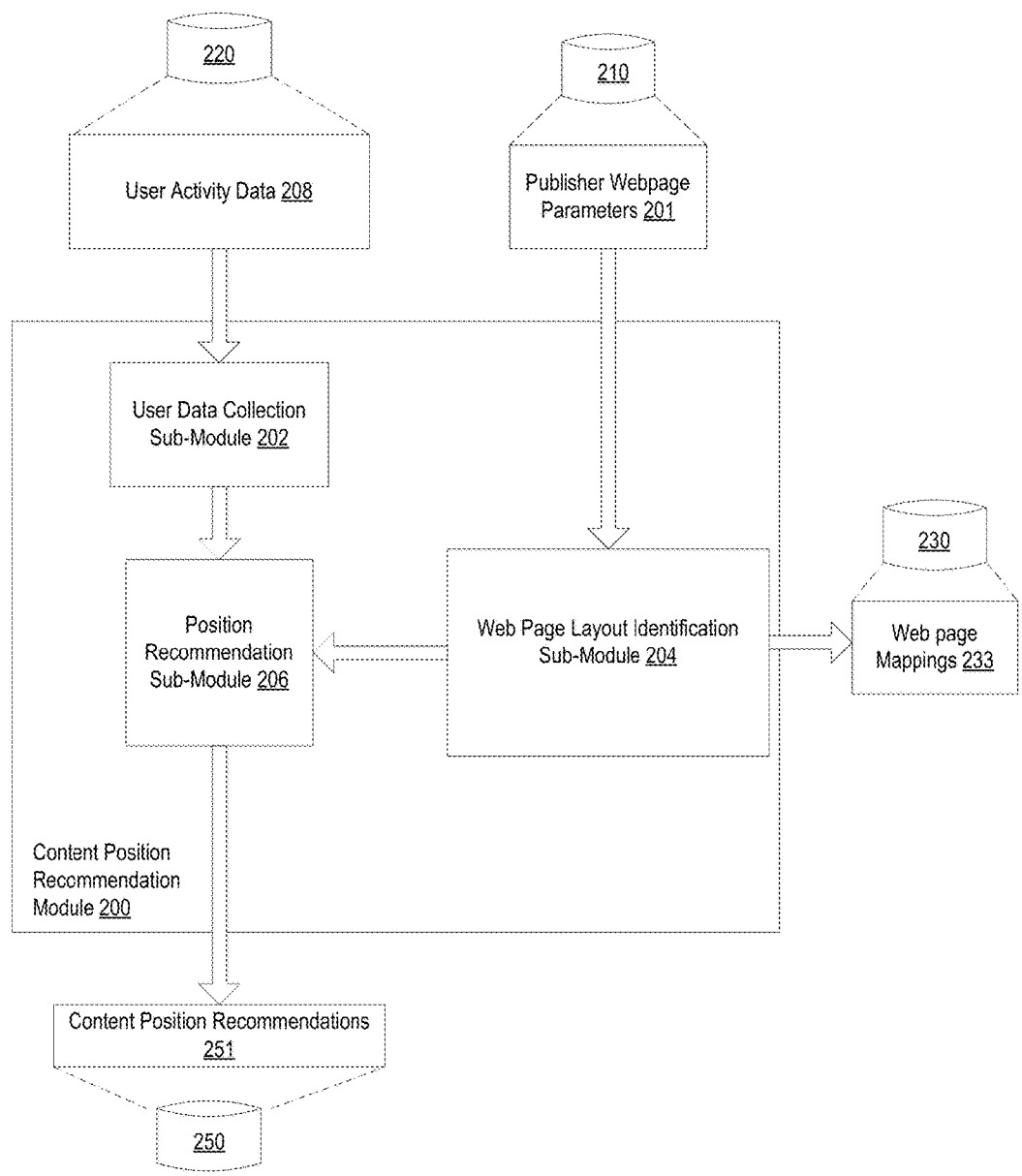
FIG. 2 is a block diagram of a content position recommendation module, according to implementations of the present disclosure.

FIG. 2 is a block diagram of a content position recommendation module 200 (e.g., content position recommendation module 145 of FIG. 1), in accordance with various implementations of the present disclosure. The content position recommendation module 200 can include a user data collection sub-module 202, a web page layout identification sub-module 204, and a position recommendation sub-module 206. Note that in alternative implementations, the functionality of one or more of the user data collection sub-module 202, the web page layout identification sub-module 204, and the position recommendation sub-module 206 may be combined or divided. Note that in alternative implementations, the functionality of the content position recommendation module 200 can be separate modules.

The content position recommendation module 200 can be coupled to one or more data stores 210, 220, 230, 250 that store data. In an implementation, the data stores 210, 220, 230, 250 can be persistent storage units. A persistent storage unit can be a local storage unit or a remote storage unit. Persistent storage units can be a magnetic storage unit, optical storage unit, solid-state storage unit, electronic storage units (main memory), or similar storage unit. Persistent storage units can be a monolithic device or a distributed set of devices. A 'set', as used herein, refers to any positive whole number of items.

The data stores 210, 220, 230, 250 can store input and/or output data. The modules (e.g., the user data collection sub-module 202, the web page layout identification sub-module 204, and the position recommendation sub-module 206) can be coupled to the one or more data stores 210, 220, 230, 250 and can read from and write to the one or more data stores 210, 220, 230, 250.

According to implementations of the present disclosure, data store 220 is configured to store user activity data 208 collected by the user data collection sub-module 202. The user activity data may include information relating to user activity relating to one or more content links presented on a web page. According to implementations, the user activity includes any data relating to multiple users' electronic or web-based content consumption history pertaining to the set of content links of the web page during an activity window. As detailed above, the user activity data may include any implicit or explicit data associated with a user's electronic actions or activity including, but not limited to, clicks, visits, impressions, interactions, pointing to content link, viewing a content link but not interacting with the content link (e.g., by hovering over the link), special interest indicators such as "thumbs up" indications or "thumbs down" indications, etc.

The user activity data may be collected for any quantity of users via any suitable methodology. For example, user activity data from multiple users may be collected by the user data collection sub-module 202 by storing a user identifier (e.g., a cookie stored on the user's browser) and/or using a user login (e.g., wherein a user is associated with login credentials which enable the collection of user data for that user across multiple devices and browsers). According to implementations, the user activity data may be collected on a persistent and ongoing basis such that the user data collection sub-module continually captures updated information regarding the activities of the users on a network during an identified activity window. In an implementation, the user activity data may be collected "offline" relative to the provisioning of content position recommendations (e.g., as an ongoing backend process supplementing the source-related user activity measurement calculation process). In an implementation, the user data collection sub-module 202 provides the collected user activity data 208 to the communicatively coupled position recommendation sub-module 206 for further processing, as described in detail below.

According to implementations, the user data collection sub-module 202 is configured to identify all user activity data relating to a set of content links of a particular web page during an activity window. In an embodiment, the activity window may be any suitable time period, such as, for example, 24 hours, 25 hours, etc. For example, the collected user activity data may include a set of interactions by one or more users with a content link during each activity window, wherein a total count or quantity of interactions relating to each content link of the set of content links during the activity window may be determined.

According to implementations of the present disclosure, the web page layout identification sub-module 204 is configured to identify a layout of one or more web pages. In identifying the layout of a web page, web page layout identification sub-module 204 may identify the one or more content zones and the one or more content position boxes of the web page.

In an implementation, web page layout identification sub-module 204 may also identify an initial position of each of the set of content links presented by the web page, including the content zone and content position box where each content link is initially positioned. Each content zone, content position box, and link position may be associated with corresponding identifying information. The content zone identifier, the content position box identifier, and the link position identifier may include any information used to uniquely identify the corresponding content zone, content position box, and link position respectively.

In an implementation, the web page layout identification sub-module 204 may analyze a web page and extract the web page layout parameters (e.g., the content zones identifiers, content position box identifiers, the link position identifier, the content links and related positions, etc.). In an implementation, the web page layout identification sub-module 204 may employ any suitable methodology for extracting the web page layout, including but not limited to an XPath based analysis.

In an implementation, the web page layout identification sub-module 204 is configured to use the current assignments of content links and their respective positions on the web page or assign content links to positions on the web page. The web page layout identification sub module 204 collects the web page layout information, referred to as a web page mapping 233, including, but not limited to information identifying the content zones, content position boxes, and assigned content links (and their positions within the respective content position boxes and content zones). In an implementation, the web page mapping 233 frequently updates (for e.g. every 5 minutes) the web page layout information that is captured by a website content crawler component. In an implementation, the web page layout identification sub module 204 stores the corresponding web page mapping 233 for each of the analyzed web pages (e.g., in data store 230) and provides the web page mappings to the communicatively coupled position recommendation sub-module 206. In an implementation, the web page layout identification sub-module 204 may perform the exemplary method described in detail in connection with FIG. 3.

The position recommendation sub-module 206 is configured to receive the user activity data 208 to identify a user session associated with a particular user based on the collected user activity data. In an implementation, the position recommendation sub-module 206 is configured to generate content positions recommendations 251 relating to a set of content links. The content position recommendations 251 include a recommended position (e.g., content zone and content position box) on the web page for each of the set of content links. In an implementation, the position recommendation sub-module 206 is configured to implement the methods described in detail below.

According to implementations, the content position recommendation module 200 may determine content position recommendations 251 for multiple content links, web pages, and publishers, as described below in detail with regard to FIGS. 3, 4 and 5.

Figure 3:
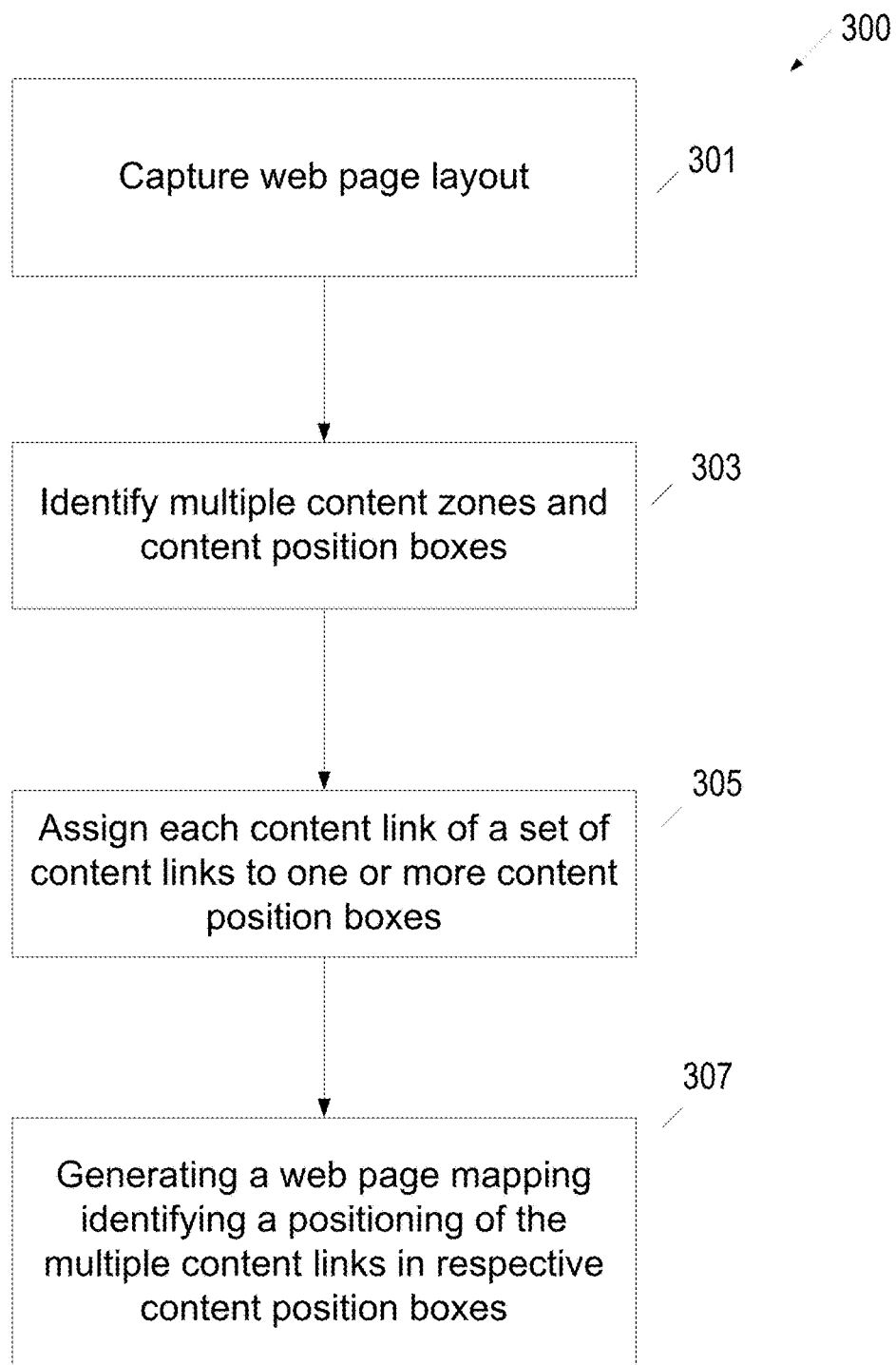
FIG. 3 is a flow diagram of an implementation of a method for storing a mapping identifying a positioning of multiple content links and associated content position boxes of a web page, according to implementations of the present disclosure.

FIG. 3 is a flow diagram of an exemplary implementation of a method 300 for generating a mapping relating to a web page. The method may be performed by processing logic that may comprise hardware (circuitry, dedicated logic, etc.), software (such as is run on a general purpose computer system or a dedicated machine), or a combination of both. In an implementation, the method 300 may be performed by the content position recommendation module 145 hosted in a server 140 of FIG. 1 or by the content position recommendation module 200 illustrated in FIG. 2.

At block 301, the content position recommendation module captures a web page layout relating to a particular web page. In an implementation, the web page layout includes various attributes, parameters, settings, etc. of the extracted web page. At block 303, the extracted web page information may be used to identify one or more content zones and one or more content position boxes of the web page. In an implementation, the captured web page layout may also include information identifying one or more content links presented on the web page and the current position of those content links (i.e., the current content zone and content position box of the content link). In an implementation, the content zones and content position boxes may be tagged for capture or identification using a suitable web page information extraction tool, such as XPath. In an implementation, the content position recommendation module may collect the tag information relating to the content zones and content position boxes from a user (e.g., an editor associated with the web page publisher). In addition, the content position recommendation module may identify and establish the identifying information associated with the content zones and the content position boxes of the web page. In an implementation, the identified content zones may each include one or more content position boxes wherein content links may be positioned.

In an implementation, in block 305, the content position recommendation module assigns each content link of a set of content links to one or more content position boxes. In an implementation, the set of content links may include some or all of the content links identified during the initial extraction of the web page layout. In an implementation, the set of content links assigned to respective content position boxes/content zones may include one or more other content links received from a content source (e.g., the publisher or another content provider).

In block 307, the content position recommendation generates a web page mapping identifying a positioning of the multiple content links in their respective content position boxes/content zones. In an implementation, the web page mapping also includes a position parameter, referred to as the Y-position value, which represents a position associated with an instance of a content link. In an example, if the same content link appears multiple times on a web page, the first instance of the content link is assigned a Y-position value of 0, the second instance of the content link is assigned a Y-position value of 1, the third instance of the content link is assigned a Y-position value of 2, and so on. The content position recommendation module determines and stores the Y-position value for each content link as part of the web page mapping. For example, FIG. 5 illustrates an exemplary web page layout and mapping 500 including multiple content zones (e.g., content zones 1, 2, 3) and multiple content position boxes (e.g., content position boxes 1-6), identified according to method 300. As illustrated, the content boxes include associated content links (e.g., content links A-L).

Figure 4:
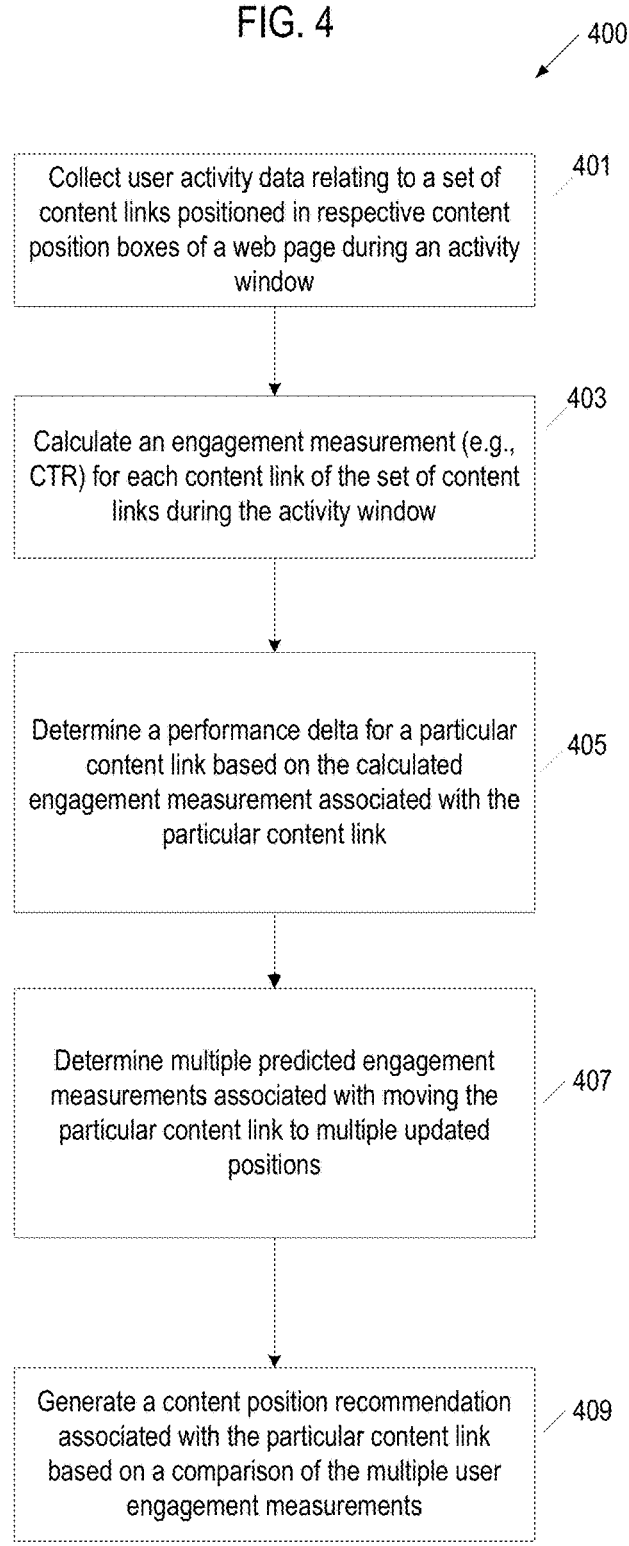
FIG. 4 illustrates an exemplary method for identifying a content placement recommendation associated with a content link, according to implementations of the present disclosure.
Figure 5:
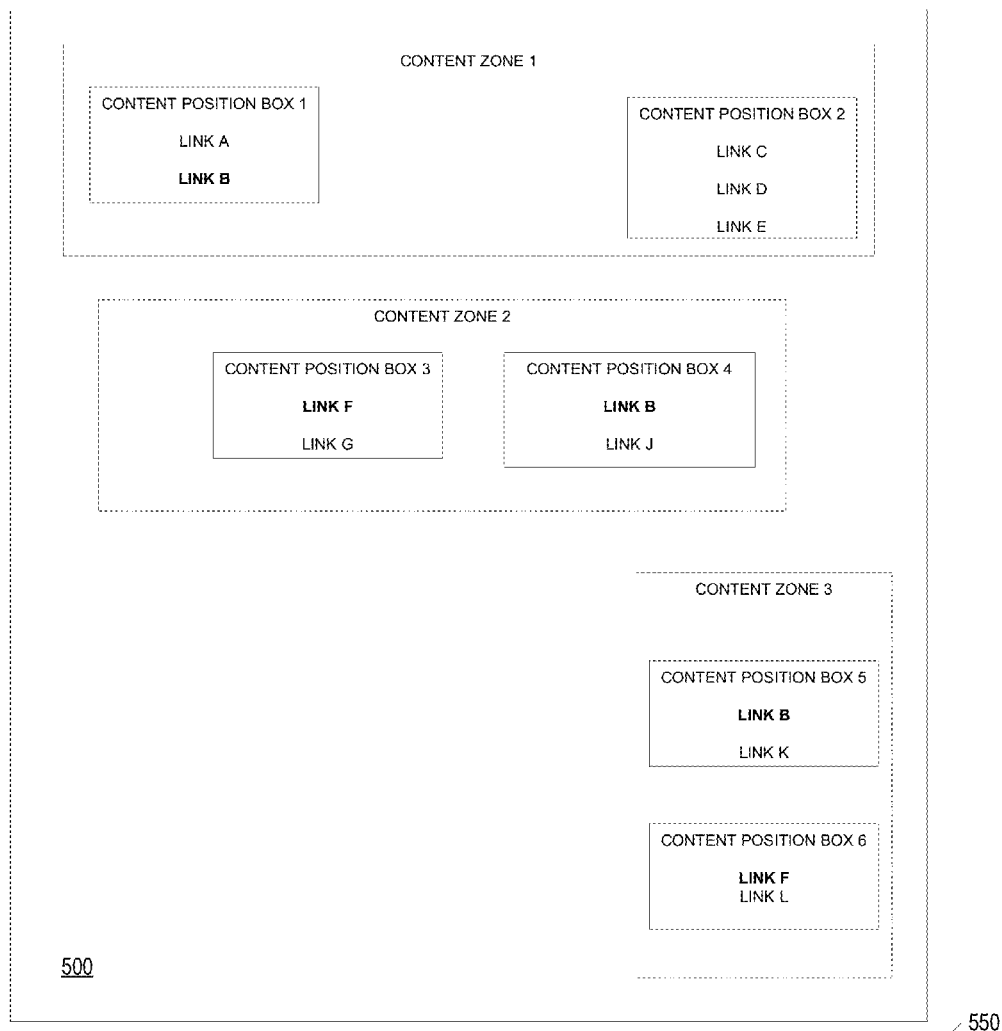
FIG. 5 illustrates an exemplary web page layout including multiple content zones, content position boxes, content links and a table including associated content position information, according to implementations of the present disclosure.

FIG. 4 is a flow diagram of an exemplary implementation of a method 400 for generating a content position recommendation for a content link, wherein the content position recommendation module identifies an optimized position for every particular content link. The method 400 may be performed by processing logic that may comprise hardware (circuitry, dedicated logic, etc.), software (such as is run on a general purpose computer system or a dedicated machine), or a combination of both. In an implementation, the method 400 may be performed by the content position recommendation module 145 hosted in a server 140 of FIG. 1 or by the content position recommendation module 200 illustrated in FIG. 2.

In block 401, the content position recommendation module collects, during an activity window, user activity data relating to a set of content links positioned in the respective content position boxes of a web page. In an implementation, a website content crawler component parses each web page for its structure and determines the web page location of each of the content zones and content position boxes using the tags associated with the content link and related content position box and content zone (e.g., <div>attribute=content-zone=breaking news</div>). In an implementation, HTTP requests made to each content link are tracked by a combination of the tracking script and tracking system webservers that receive the HTTP requests. In an implementation, a unique record is generated and stored each time a user interacts with a content link in its associated content position box. In an implementation, a suitable tracking script deployed on the publisher's website (wherein the web page is presented) is loaded and executed when a user clicks on a content link.

In an implementation, the content position recommendation module tracks and records the Y-position value associated with the content link. As such, when multiple instances of the same content link appear on a web page (e.g., when a first content link appears in content zone 1/content position box 2 and content zone 3/content position box 6), the Y-position value associated with the particular instance of the content link clicked on by a user is recorded and stored. The content position recommendation module collects multiple components of information associated with each instance of user activity data related to the set of content links, including but not limited to, the content zone identifying information, the content position box identifying information, the content link identifying information, the Y-position value, a referring content link, a seen content link, etc.).

In an implementation, the content position recommendation module is associated with a data store (e.g., a suitable memory) wherein the collected user activity data is stored along with other information associated with the identified web page mapping. FIG. 5 illustrates an exemplary table 550 including the collected user activity data and other web page mapping information associated with a web page. As shown in FIG. 5, the table 550 relates to web page mapping 500, the content link identifier, content position box identifier, content zone identifier, the link position identifier, Y-position value, and activity count (e.g., a number of interactions with the respective content link during the activity window (e.g., period X).

In an implementation, in block 403, the user activity data is recorded during the activity window period in order to calculate an engagement measurement (e.g., a click through rate, a revenue per 1,000 impressions (RPM) measurement) for each content link of the set of content links during the activity window. In an implementation, a quantity of instances when a particular content link at a given position on the web page is interacted with by a user (e.g., the activity count associated with a particular content link) is measured. In an implementation, the quantity of user clicks on a content link, content position box and content zone is tracked. Advantageously, method 400 determines which specific content links have received clicks while positioned in their current content position box on a web page during the activity window.

In block 405, the content position recommendation module determines a performance delta for a particular content link based on the calculated engagement measurement (determined in block 403). In an implementation, the performance delta represents a comparison of the engagement measurement derived from the collected user activity data and a positional benchmark engagement measurement associated with each content position box. The positional benchmark engagement measurement represents performance information relating to the content position boxes of the web page based on historical user activity information. For example, a positional benchmark engagement measurement may be determined for each content position box over a first period of time (e.g., a month).

The positional benchmark engagement measurement may be determined in a manner as described with regard to block 403 during a prior activity period. In an implementation, the positional benchmark engagement measurement may be iteratively updated and re-calculated based on updated user activity information. The content position recommendation module may store the positional benchmark engagement measurement associated with each of the content position boxes and use that information to compare with the engagement measurement associated with the placement of a particular content link. In an implementation, the positional benchmark engagement measurement represents a historical perspective as to how one or more content links "performed" in a particular content position box.

For example, the positional benchmark engagement measurement may be a click through rate (CTR) defined as the percentage of users visiting a web page who click on a specific content link within a content position box of the web page. The CTR data can be collected over a certain rolling benchmarking period (e.g., one day, one week, one month) in order to provide a robust and reliable measurement of the performance of the content link/content position box pairing. In an implementation, the benchmarking period may be divided into further sub-sets of time (e.g., 4 hour blocks) to account for time-of-day variations in CTR.

For example, the content position recommendation module may determine a positional benchmark engagement measurement (e.g., CTR) for a content link in content zone 1/content position box 1. Based on the historical data collected during the benchmarking period (e.g., 14 days) for that content zone/content position box pairing, it may be determined that the associated positional benchmark engagement measurement (e.g., CTR value) is 4.5%.

In an implementation, the identified positional benchmark engagement measurement associated with highly promoted content links (e.g., content links appearing in a premium position on the web page, such as at the top of the web page (e.g., content zone 1 in FIG. 5)) may be normalized for comparison with other less promoted content links (e.g., content links in lower content position boxes on the web page). For example, a high performing content link (e.g., a story about the weather) in a lower web page position (e.g., a lower content position box) may be identified and recommended for promotion to a higher content position box (in block 409).

In an example, in block 403, it may be determined that a content link in a low content position box (e.g., content position box 6 of FIG. 5) has an engagement measurement of 40 clicks. Based on historical data, it may be determined that the same content position box (e.g., content position box 6 of FIG. 5) has a positional benchmark engagement measurement of 20 clicks. In block 405, the performance delta is determined based on the comparison of the engagement measurement (actual performance of the particular content link in the content position box during the activity window) and the positional benchmark engagement measurement (e.g., the expected performance associated with the same content position box). In this example, the performance delta may be the difference between the two measurements (e.g., 40−20=20).

In block 407, the content position recommendation module determines multiple predicted engagement measurements associated with moving (or re-positioning) the particular content link to multiple updated positions. In an implementation, the predicted engagement measurement for the multiple candidate position recommendations may be determined based on the performance delta (determined in block 405) and the positional benchmark engagement measurement associated with the updated (or candidate) content position box. Continuing the example above, it is determined that the positional benchmark engagement measurement for an updated position is 100 clicks. As such, a predicted engagement measurement may be determined by adding the performance delta (20 clicks) to the positional benchmark engagement measurement for the updated position (100 clicks). In this example, the predicted engagement measurement associated with moving the particular content link to the updated position is 120 clicks. A predicted engagement measurement may be determined for each of the potential content position boxes to which the content link can be moved. For example, with regard to the web page layout 500 in FIG. 5, for content link G, a predicted engagement measurement may be determined for each of the possible candidate or updated positions, such as, the positions of content position boxes 1, 2, 4, 5, and 6.

In an implementation, the user engagement measurement may be represented by a "drive ratio," which is a number of additional clicks or page views derived from a click on an initial content link (e.g., a single article view can be assigned a drive ratio of 1, wherein an additional click on another article accessed via the first clicked article is assigned a drive ratio of 2, and so on). The drive ratio for each content link may be aggregated for multiple users who have clicked the particular content link during a period of time (e.g., a 3 day period).

In block 409, the content position recommendation module generates a content position recommendation for a particular content link based on a comparison of the multiple predicted engagement measurements (determined in block 407). In an implementation, an updated content position box having a highest or optimal predicted engagement measurement is identified as the content position recommendation for the associated content link. For example, if as a result of blocks 401-407, a first, second and third candidate content position box (having respective predicted engagement measurements of 130, 119, and 132) are identified for a particular link, the content position recommendation module identifies the third candidate position box as the content position recommendation. In an implementation, the content position recommendation module may generate content position recommendations for any number of content links, in accordance with method 400.

In an implementation, the content position recommendation module uses the method 400 and the tracked user activity data to generate a ranked list of content position recommendations including a pairing of a content link and a content position box. In an implementation, the content position recommendation module may review the list of current benchmarked positions and the ranked content link list and perform a "greedy" matching between them. For example, a content link g having a Y-position value of 2 may be matched with content position box 2 (cp2) to give a recommendation value of (g2,p2) which constitutes a measure of the predicted engagement measurement or expected revenue for that content link in that specific position.

In an implementation, various editorial constraints or filters (e.g., the age of a story, story type, associated image, deleted content, pinned content etc.) can be applied by the content position recommendation module to the ranked recommendation list. These filters may be customized by configuring an editorial rules engine to comply with the specific editorial tone, policy, rules, constraint, guidelines, or parameters of each respective content publisher. For example, if a particular position-content matching is blocked by an editorial constraint, the content position recommendation module may identify the next best match until all qualifying content links are matched to all the positions within all of the content position boxes of the web page.

In an implementation, the content position recommendation module uses the stored user activity data relating to interactions with the content links to compile aggregated statistics on a semi-real-time basis, according to logical rules optimized for editorial recommendations. In an implementation, the content position recommendation module utilizes the stored positional benchmark engagement measurement data to make editorial recommendations. For example, the content position recommendation module may recommend moving a content link to a different content box and link position on the web page and predict the expected CTR, RPM and other measures of user engagement for that content link in the updated (recommended) position. In an implementation, for each web page content link and content position box combination, data on impressions (clicks and views) is collected in 15 second increments. For example, the web page as a whole may receive 1,000 impressions in 15 seconds, while content link and content position box/link position combination may receive a lesser number of clicks (e.g., 10, 15 or 20). The data is aggregated and stored, with the overall recent near-term data (e.g., from the last 15 minutes) being used to make near-term future editorial performance recommendations (e.g., for the next 15 minutes). In an implementation, position recommendations and performance predictions are generated in near real-time for every content link and content position box/link position on the web page.

Figure 6:
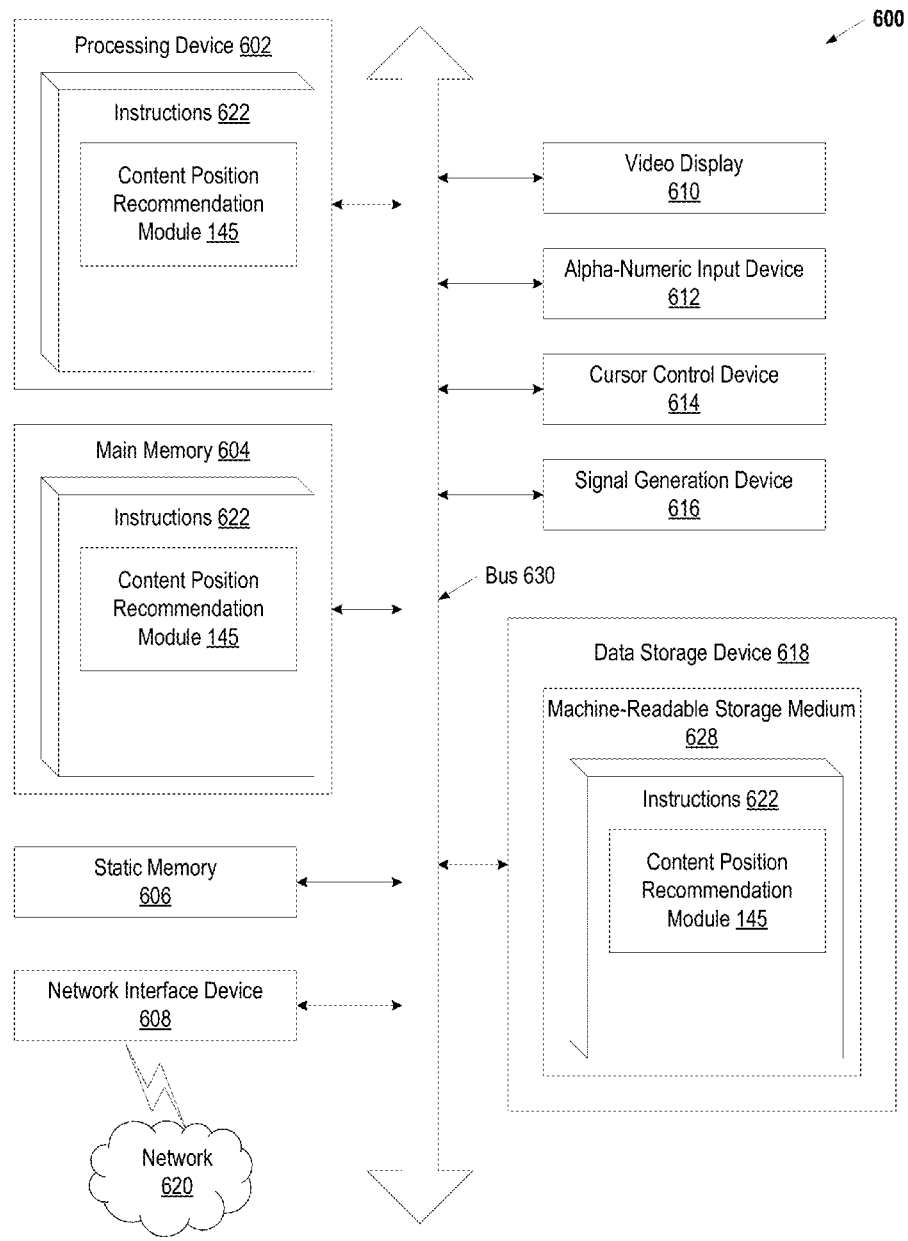
FIG. 6 is a block diagram of an example computer system that may perform one or more of the operations described herein, according to implementations of the present disclosure.

FIG. 6 is a block diagram of an example computer system 600 that may perform one or more of the operations described herein, in accordance with various implementations In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (e.g., a processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 on which is stored one or more sets of instructions 622 (e.g., software) embodying any one or more of the methodologies or functions described herein. The instructions 622 may also reside, completely or at least partially, within the main memory 604 and/or within the processor 602 during execution thereof by the computer system 600, the main memory 604 and the processor 602 also constituting computer-readable storage media. The instructions 622 may further be transmitted or received over a network 620 via the network interface device 608.

In one implementation, the instructions 622 include instructions for a module (e.g., content position recommendation module 145 in FIG. 1) and/or a software library containing methods that call the optimization module. While the computer-readable storage medium 628 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "collecting", "calculating", "determining", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete and teachable fashion.

The terms "first", "second", "third", "fourth", etc. as used herein are meant as labels to distinguish among different elements and may not necessarily have an ordinal meaning according to their numerical designation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
collecting, during a first activity window, user activity data associated with a set of content links positioned in one or more content position boxes of a plurality of content position boxes of a first web page;
calculating based on the user activity data collected during the first activity window, a first engagement measurement associated with a first instance of a particular content link of the set of content links;
determining a first Y-position value associated with the first instance of the particular content link on the first web page, wherein a second instance of the particular content link appears with the first instance on the first web page, and wherein the second instance has a second Y-position value;
calculating a positional benchmark engagement measurement associated with each of the plurality of content position boxes of the first web page;
determining a performance delta for the first instance of the particular content link based on the first engagement measurement associated with the first instance of the particular content link at a first content position box and a positional benchmark engagement measurement associated with the first content position box of the first web page;
determining a plurality of predicted user engagement measurements associated with placing the particular content link at each of the plurality of content position boxes of the web page, wherein a first predicted user engagement measurement is determined based on the performance delta for the particular content link, the first Y-position value associated with the particular content link, and the positional benchmark engagement measurement associated with the first content position box of the web page;
generating, by a processing device, a first content position recommendation associated with the particular content link based on a comparison of the plurality of predicted user engagement measurements; and
generating a second position recommendation associated with the particular content link based on user activity data collected during a second activity window.

2. The method of claim 1, further comprising capturing a layout of the first web page.

3. The method of claim 2, further comprising:
identifying a plurality of content zones and the plurality of content position boxes based on the layout of the first web page.

4. The method of claim 3, further comprising:
assigning the set of content links to one or more of the plurality of content position boxes; and generating a mapping identifying a positioning of the set of content links to the one or more of the plurality of content position boxes.

5. The method of claim 1, wherein the first activity window comprises at least thirty days.

6. A system comprising:
a memory to store instructions; and
a processing device operatively coupled to the memory, the processing device to execute the instructions to:
collect, during a first activity window, user activity data associated with a set of content links positioned in one or more content position boxes of a plurality of content position boxes of a first web page;
calculate, based on the user activity data collected during the first activity window, a first engagement measurement associated with a first instance of a particular content link of the set of content links;
determine a first Y-position value associated with the first instance of the particular content link on the first web page, wherein a second instance of the particular content link appears with the first instance on the first web page, and wherein the second instance has a second Y-position value;
calculate a positional benchmark engagement measurement associated with each of the plurality of content position boxes of the first web page;
determine a performance delta for the first instance of the particular content link based on the first engagement measurement associated with the first instance of the particular content link at a first content position box and a positional benchmark engagement measurement associated with the first content position box of the first web page;
determine a plurality of predicted user engagement measurements associated with placing the particular content link at each of the plurality of content position boxes of the web page, wherein a first predicted user engagement measurement is determined based on the performance delta for the particular content link, the first Y-position value associated with the particular content link, and the positional benchmark engagement measurement associated with the first content position box of the first web page;
generate a first content position recommendation associated with the particular content link based on a comparison of the plurality of predicted user engagement measurements; and
generate a second position recommendation associated with the particular content link based on user activity data collected during a second activity window.

7. The system of claim 6, wherein the processing device is further configured to capture a layout of the first web page.

8. The system of claim 7, wherein the processing device is further configured to identify a plurality of content zones and the plurality of content position boxes based on the layout of the first web page.

9. The system of claim 8, wherein the processing device is further configured to:
assign the set of content links to one or more of the plurality of content position boxes, and
generate a mapping identifying a positioning of the set of content links to the one or more of the plurality of content position boxes.

10. A non-transitory computer readable storage medium comprising instructions thereon that, in response to execution by a processing device, cause the processing device to:
collect, during a first activity window, user activity data associated with a set of content links positioned in one or more content position boxes of a plurality of content position boxes of a first web page;
calculate, based on the user activity data collected during the first activity window, a first engagement measurement associated with a first instance of a particular content link of the set of content links;
determine a first Y-position value associated with the first instance of the particular content link on the first web page, wherein a second instance of the particular content link appears with the first instance on the first web page, and wherein the second instance has a second Y-position value;
calculate a positional benchmark engagement measurement associated with each of the plurality of content position boxes of the first web page;
determine a performance delta for the first instance of the particular content link based on the first engagement measurement associated with the first instance of the particular content link at a first content position box and a positional benchmark engagement measurement associated with the first content position box of the first web page;
determine a plurality of predicted user engagement measurements associated with placing the particular content link at each of the plurality of content position boxes of the web page, wherein a first predicted user engagement measurement is determined based on the performance delta for the particular content link, the first Y-position value associated with the particular content link, and the positional benchmark engagement measurement associated with the first content position box of the first web page;
generate a first content position recommendation associated with the particular content link based on a comparison of the plurality of predicted user engagement measurements; and
generate a second position recommendation associated with the particular content link based on user activity data collected during a second activity window.

11. The non-transitory computer readable storage medium of claim 10, the processing device to capture a layout of the first web page.

12. The non-transitory computer readable storage medium of claim 11, the processing device to:
identify a plurality of content zones and the plurality of content position boxes based on the layout of the first web page.

13. The non-transitory computer readable storage medium of claim 12, the processing device to:
assign the set of content links to one or more of the plurality of content position boxes; and
generate a mapping identifying a positioning of the set of content links to the one or more of the plurality of content position boxes.

* * * * *